United States Patent
Polehn

(10) Patent No.: US 10,230,465 B1
(45) Date of Patent: Mar. 12, 2019

(54) DIRECT OPTICAL TO RF TRANSCEIVER FOR A WIRELESS SYSTEM

(71) Applicant: Verizon Patent and Licensing Inc., Arlington, VA (US)

(72) Inventor: Donna L. Polehn, Kirkland, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/877,663

(22) Filed: Jan. 23, 2018

(51) Int. Cl.
*H04B 10/112* (2013.01)
*H04B 10/2575* (2013.01)

(52) U.S. Cl.
CPC ..... *H04B 10/1123* (2013.01); *H04B 10/2575* (2013.01)

(58) Field of Classification Search
CPC ... H04B 10/11–10/118; H04B 10/2575; H04B 10/25752; H04B 10/40; H04B 10/807
See application file for complete search history.

(56) References Cited

U.S. PATENT DOCUMENTS

| | | | | |
|---|---|---|---|---|
| 5,710,651 A | * | 1/1998 | Logan, Jr. | H03B 28/00 398/106 |
| 2002/0114044 A1 | * | 8/2002 | Chiou | H04B 10/1125 398/121 |
| 2004/0258414 A1 | * | 12/2004 | Lee | H04B 10/1123 398/115 |
| 2014/0255039 A1 | * | 9/2014 | Prather | H04B 10/1129 398/130 |
| 2014/0314414 A1 | * | 10/2014 | Cheng | H04J 14/02 398/68 |
| 2016/0308614 A1 | * | 10/2016 | Tsonev | H04B 10/116 |

* cited by examiner

*Primary Examiner* — Casey Kretzer

(57) ABSTRACT

A hybrid optical-RF device, called a "stamp cell" herein, may be a small, passive repeating device that is designed to be placed close to User Equipment (UE) such that the UE only needs to reach a few meters using high frequency RF signals. The stamp cell may directly convert the received RF signal to an optical signal which may be transmitted to an optical receiver mounted on a traditional cell tower. Similarly, in the downlink direction, the stamp cell may receive optical signals from the cell tower and convert the optical signals to high frequency RF signals, which may be received by the UE.

20 Claims, 8 Drawing Sheets

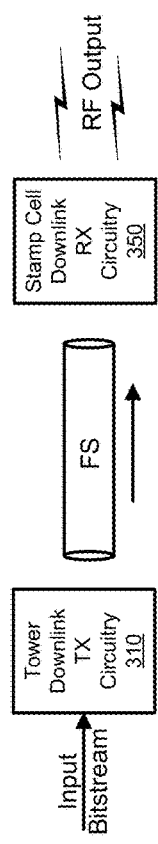
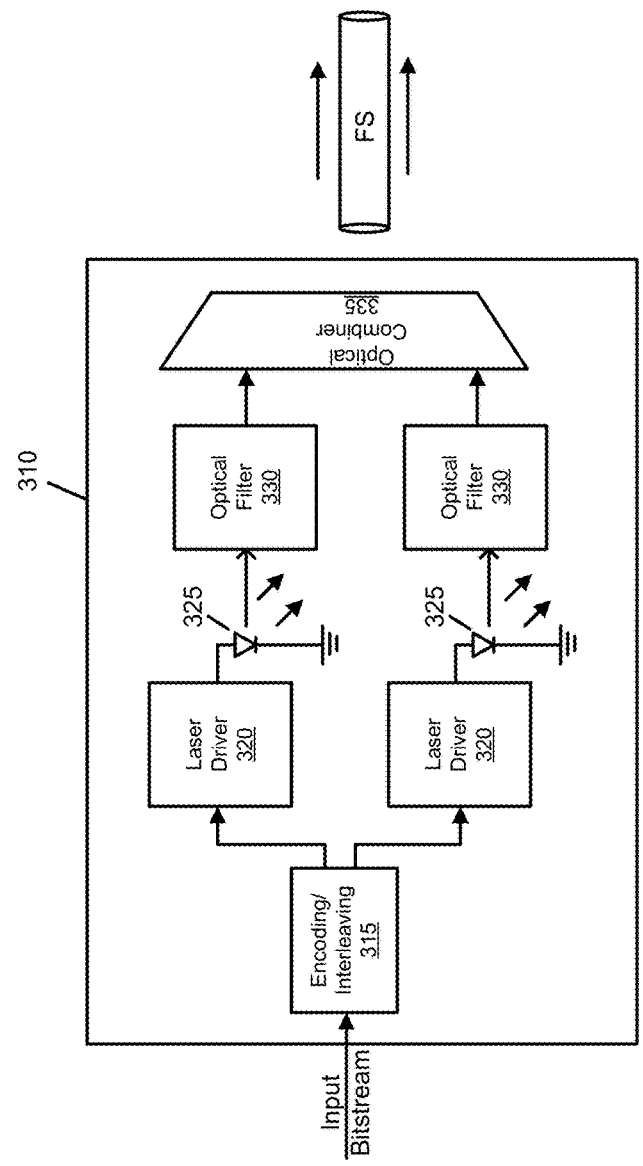
Fig. 3A
Fig. 3B

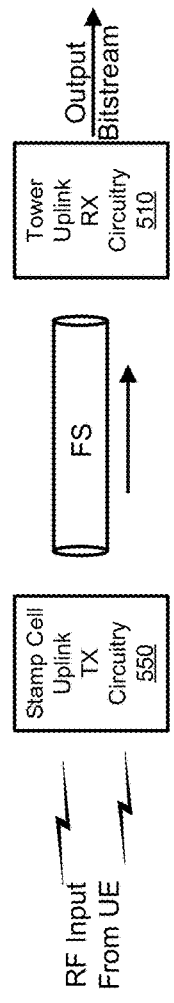
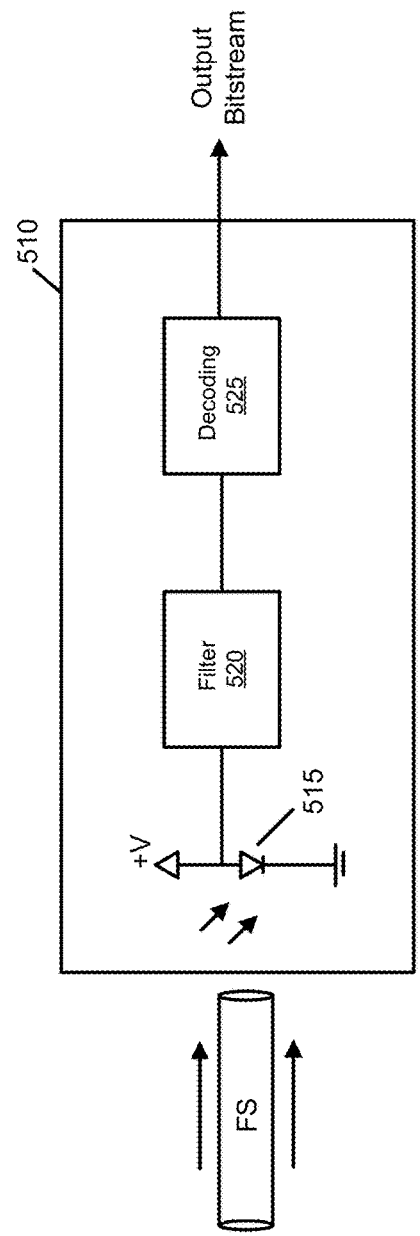

US 10,230,465 B1

DIRECT OPTICAL TO RF TRANSCEIVER FOR A WIRELESS SYSTEM

BACKGROUND

Emerging wireless standards for wireless cellular networks can use very high radio frequency bands (e.g., 14 gigahertz (GHz) and higher). A 5G New Radio (NR), for example, may be operable over a wide range of frequency bands, including very high frequency bands, such as bands from 14 GHz-100 GHz.

A primary benefit of using these frequencies is the large amount of spectrum can provide very high bandwidths. A drawback of high frequency radio transmissions, however, is that it can be difficult to make transceivers that can reach longer ranges (e.g., >100 meters) without requiring an exponential increase in power.

BRIEF DESCRIPTION OF THE DRAWINGS

FIGS. 3A-3C are diagrams illustrating example components relating to downlink operation using stamp cells;

FIGS. 5A-5C are diagrams illustrating example components relating to uplink operation using stamp cells.

DETAILED DESCRIPTION OF PREFERRED EMBODIMENTS

The following detailed description refers to the accompanying drawings. The same reference numbers in different drawings may identify the same or similar elements.

A hybrid optical-Radio Frequency (RF) device, referred to as a "stamp cell" herein, is described. The stamp cell may be a small, passive repeating device that is designed to be placed close to User Equipment (UE) such that transmissions from the UE, using the high frequency RF signals, only need to reach a few meters. The stamp cell may directly convert the received RF signal to an optical signal which may be transmitted to an optical receiver mounted on, for example, a traditional cell tower. Similarly, in the downlink direction, the stamp cell may receive optical signals from the cell tower and convert the optical signals to high frequency RF signals, which may be received by the UE.

Figure 1:
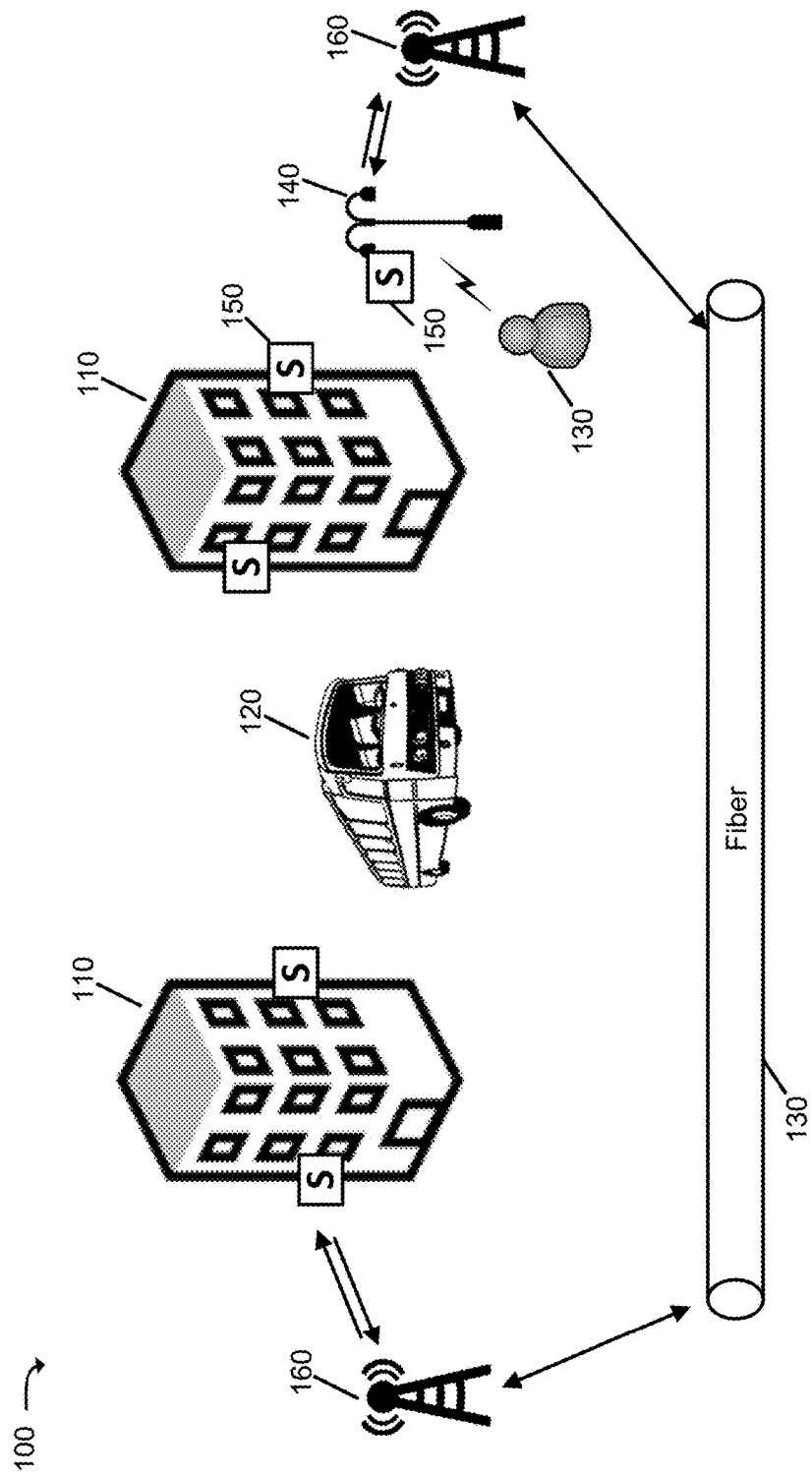
FIG. 1 is a diagram illustrating an overview of concepts described herein.

FIG. 1 is a diagram illustrating an overview of concepts described herein. As illustrated, an example environment 100 may be an urban environment that includes, for example, buildings 110, vehicles 120, pedestrians 130, and a street light 140. Stamp cells 150 (shown as an "S") may be positioned at various locations in environment 100. As shown, stamp cells 150 are mounted in or on buildings 110 and street light 140. A number of cell towers 160, connected to a fiber backbone link (e.g., in a distribution network), are also illustrated.

Stamp cells 150 may be passive devices that do not require a battery or other power source. Alternatively, stamp cells 150 may be an active device, such as devices powered with a battery or connected to the power grid. Stamp cells 150 may be relatively small devices, such as electrical devices that have an area on the order of about a few square centimeters up to about a square meter. Stamp cells 150 may also be relatively inexpensive, and may thus be economically deployed relatively densely.

Stamp cells 150 may be able to communicate, using high frequency RF signals (e.g. 14 GHz and higher), over relatively short distances (e.g., on the order of about a few meters). The use of the high frequencies may enable stamp cells 150, when in range of a user, to provide high bandwidth data streams to the user.

Assume pedestrian 130 is using a UE that is in range of a stamp cell 150 (e.g., a stamp cell mounted on street light 140). In the uplink direction (i.e., UE to network direction), the stamp cell may receive RF signals from the UE, convert the RF signals to optical signals, and transmit the optical signals to cell tower 160. Cell tower 160 may include a corresponding optical receiver to receive the optical signals and transmit the signals to a backbone network 170. The conversion from RF to optical signals, by stamp cell 150, may be performed passively in which the energy of the RF signal and/or energy derived from optical signals received from cell tower 160, is used to power the generation of the optical signal. Similarly, in the downlink direction, optical signals received from cell tower 160, by stamp cell 150, may be converted to high frequency RF signals for reception by the UE.

In some implementations, the passive operation of the stamp cell may be implemented using energy obtained, by the stamp cell, from either or both of the incoming radio waves or optical (laser) signals. In other implementations, the "passive" operation may refer to the fact that the stamp cell may require very little power to operate, and which may potentially be obtained from a relatively small battery or solar cell (or both) associated with the stamp cell.

Advantageously, as described above with reference to environment 100, stamp cells 150 may enable high frequency RF communications, using 5G or future generation radio technologies, via small, passive devices that can be unobtrusively placed throughout an environment. Fiber or power cabling may not be required at the deployment points of the stamp cells.

Figure 2:
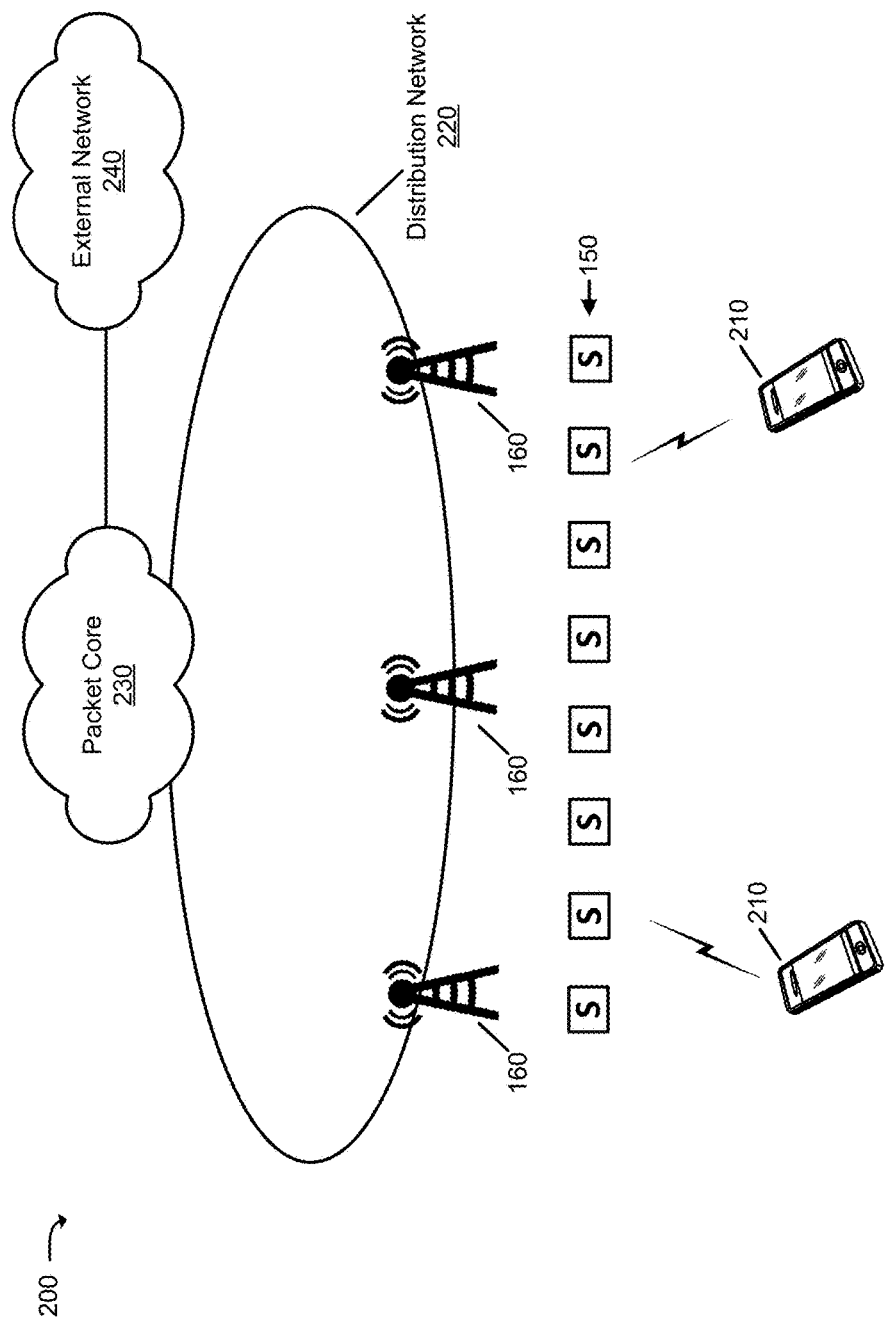
FIG. 2 is a diagram illustrating an example network architecture relating to operation of stamp cells in a telecommunication network.

FIG. 2 is a diagram illustrating an example network architecture 200 relating to operation of the stamp cells in a telecommunication network. As shown, a plurality of stamp cells 150 may be installed at locations near (i.e., within free-space optical transmission range) cell towers 160. A cell tower 160, as used herein, may broadly refer to a network element of the telecommunications network that operates as an access point or node for UEs. A cell tower may include, for example, a base station, an enhanced NodeB (eNB), a next generation Node (e.g. gNodeB), an Access Point, or some other type of wireless transmission/reception node. Cell tower 160 may not necessarily be implemented as a physical tower. A cell tower 160 may include, for example, antennas and/or radio transceivers that may implement a base station in the telecommunications network. Stamp cells 150 may be positioned in such a way that a free space laser link is aimed between the optical transmitter/receiver of the stamp cell and the corresponding optical transmitter/receiver of the cell tower. Stamp cells 150 may connect UEs 210 with cell towers 160 using high frequency radio links between UEs 210 and stamp cells 150.

Architecture 200 may additionally include a distribution network 220 that connects cell towers 160 to packet core network 230. Distribution network 220 may be, for example, a high speed fiber distribution network. Packet core 230 may include, for example, an evolved packet core (EPC) network such as one that operates based on a 3rd Generation Partnership Project (3GPP) Wireless Communication Standard or other wireless standards. Packet core 230 may generally provide control and data transmission functions to manage the wireless connections with UEs 210.

Figure 3C:
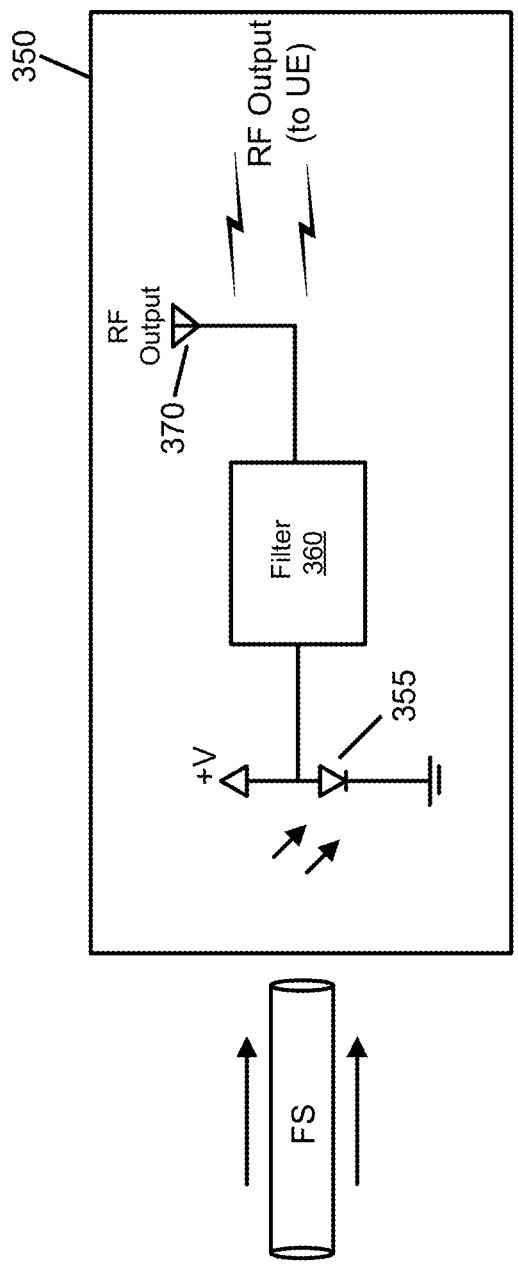

FIGS. 3A-3C are diagrams illustrating example components relating to downlink (i.e., from the network to a UE) operation using stamp cells 150. As mentioned, cell tower 160 may include optical receivers and transmitters for communicating with stamp cells 150. Components relating to downlink communications, with stamp cells 150, at cell tower 160 are illustrated in FIGS. 3A-3C as tower downlink transmit (TX) circuitry 310. Components relating to downlink communications, implemented as part of a stamp cell 150, are illustrated in FIGS. 3A-3C as stamp cell downlink receive (RX) circuitry 350.

As shown in FIG. 3A, an input bitstream (i.e., a downlink bitstream originated in packet core 230 or external network 240) may be received, via distribution network 220, at cell tower 160. The bitstream may be converted into an optical signal, by downlink TX circuitry 310, and optically transmitted over a free-space (FS) link to stamp cell downlink RX circuitry 350. Alternatively, in some implementations, the optical transmission may be performed through an optical fiber instead of a free-space transmission. At stamp cell downlink RX circuitry 350, the optical signal may be converted into a high frequency RF signal for transmission to UE 210.

For a FS optical signal, the signal may need to be aimed so that the transmitted signal is received at an appropriate sensor at stamp cell downlink RX circuitry 350. In one implementation, the aiming of the signal may be manually performed during an initial provisioning or installation of stamp cell 150. Alternatively or additionally, cell tower 160 may include an aiming mechanism to aim (or fine tune the aiming of the optical signal). For example, tower downlink TX circuitry 310 may be mounted on a platform that may be rotated through one or more degrees of freedom.

FIG. 3B is a diagram illustrating an example implementation of downlink TX circuitry 310. Downlink TX circuitry 310 may be particularly used for Continuous Wave (CW) modulation although other modulation schemes are possible. As shown, downlink TX circuitry 310 may include: encoder/interleaving component 315, laser drivers 320, laser diodes 325, optical filters 330, and optical combiner 335.

Encoding/interleaving component 315 may encode the input digital signal and/or perform interleaving (e.g., to provide error correction redundancy) to obtain a baseband digital signal that is appropriate for optical transmission. The output of encoding/interleaving component 315 may be input to laser drivers 320. As shown in FIG. 3B, two laser drivers 320 may drive laser diodes 325 to implement the conversion of the electrical signals into optical signals. The optical outputs of laser diodes 325 may be filtered by optical filters 330 to obtain the desired light frequencies, and then combined by optical combiner 335 to obtain the light signals that are transmitted over the free-space channel.

Two light channels, implemented by two laser drivers 320, two light laser diodes 325, and two optical filters 330, are illustrated in FIG. 3B. By using two or more light channels for the communications, heterodyning may be used to potentially reduce the complexity of the system while allowing for high data rates (e.g., 100 giga-bits per second). In one implementation, for example, the light channels may be in the 1530-1560 nanometer (nm) range and include 60 GHz channel spacing. Dense Wavelength Division Multiplexing (DWDM) Bragg diffraction gratings may be used to achieve the channel spacing. In some implementations, the channel spacing may be as low as 10 GHz. Which is based on the following formula $$\Delta f = \frac{c}{\lambda_0^2} \Delta \lambda$$

where $\Delta f$ is the frequency differential and $\Delta \lambda$ is the wavelength differential and $\Delta_0$ is the center wavelength.

In some implementations, the modulation of the signal may be performed using modulation techniques other than CW modulation, such as Frequency-shift keying (FSK) modulation.

Figure 4:
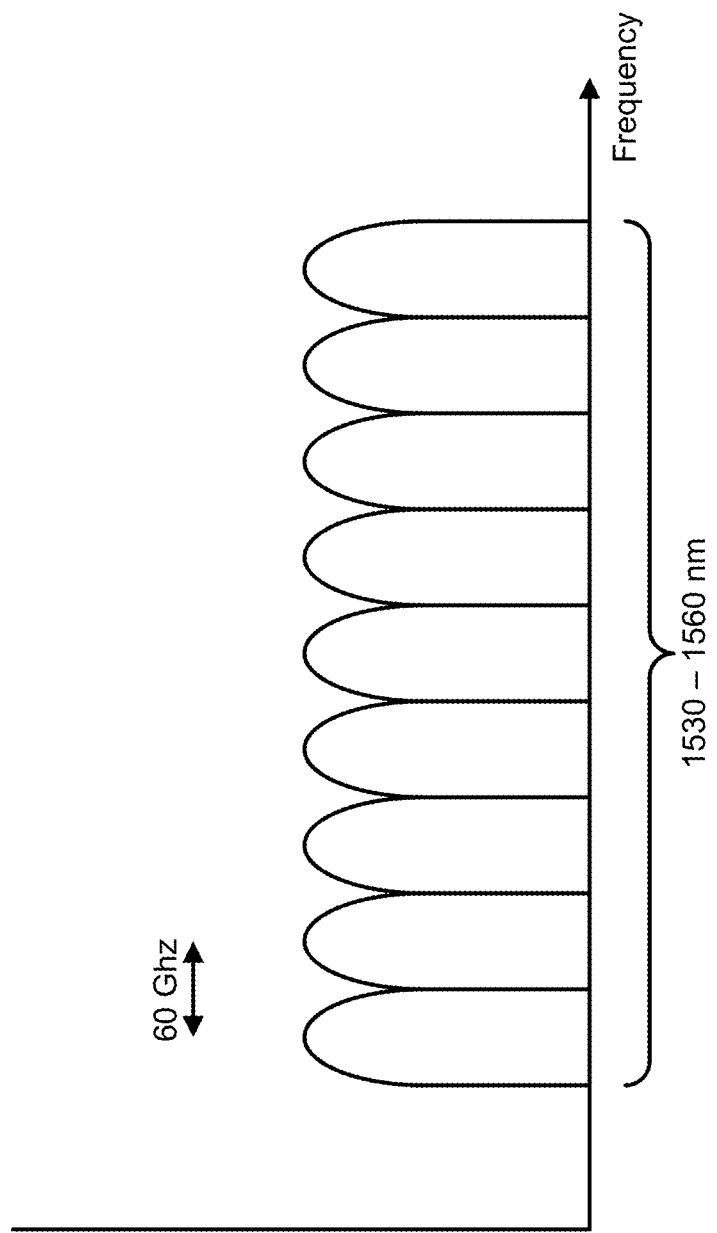
FIG. 4 is a diagram illustrating one possible example of optical channels in the 1530-1560 nm range.

FIG. 4 is a diagram illustrating one possible example of optical channels in the 1530-1560 nm range. As illustrated, a number of 60 GHz channels may be implemented in the 1530-1560 nm range (which corresponds to terrahertz (THz) frequencies). Thus, the optical signals generated by downlink TX circuitry 310 may be THz optical signals that are separated by channel bandwidths that are in the RF range (GHz range).

Referring back to FIGS. 3A-3C, FIG. 3C is a diagram illustrating an example implementation of stamp cell downlink RX circuitry 350 in additional detail. Stamp cell downlink RX circuitry 350 may include photo diode 355, filter 360, and antenna 370. Photo diode 355 may convert the incoming optical signals to an electrical signal (i.e., an electrical current), which may be filtered by filter 360. The incoming optical signals include at least two frequency channels that are spaced by a predetermined frequency differential that is in the RF range (e.g., about 60 GHz or other values). Using heterodyning, photo diode 335 may output an electrical signal having a bandwidth equal to the frequency differential in the optical signals (frequency high (FHi) minus frequency low (FLo)) to generate a GHz range RF signal. The electrical signal, output from filter 360, may be directly converted into RF transmissions by antenna 370. "Directly" converted, as used herein, may refer to the fact that the stamp-cell does not perform baseband processing. That is, stamp-cell downlink RX circuitry 350 may convert the incoming optical signal to an electrical current (having a bandwidth in the RF range), which may be converted to a radio wave by antenna 370, without requiring demodulation of the radio frequency carrier signal.

The 60 GHz frequency differential currently corresponds to an unlicensed frequency band. Other bands, such as 40 GHz, 50 GHz, or 80 GHz may alternatively be used. In general, any band, limited only by manufacturing and technical constraints, may be used.

Although a power source is illustrated, in FIG. 3C ("+V"), in some implementations, stamp cell downlink RX circuitry 350 may be implemented passively (i.e., without an external power source and where all of the needed energy is obtained from the input radio waves and/or optical signals). In these implementations, the power source may be omitted (and/or the energy used by the power source may be obtained from the incoming RF signals or light signals).

Figure 5C:
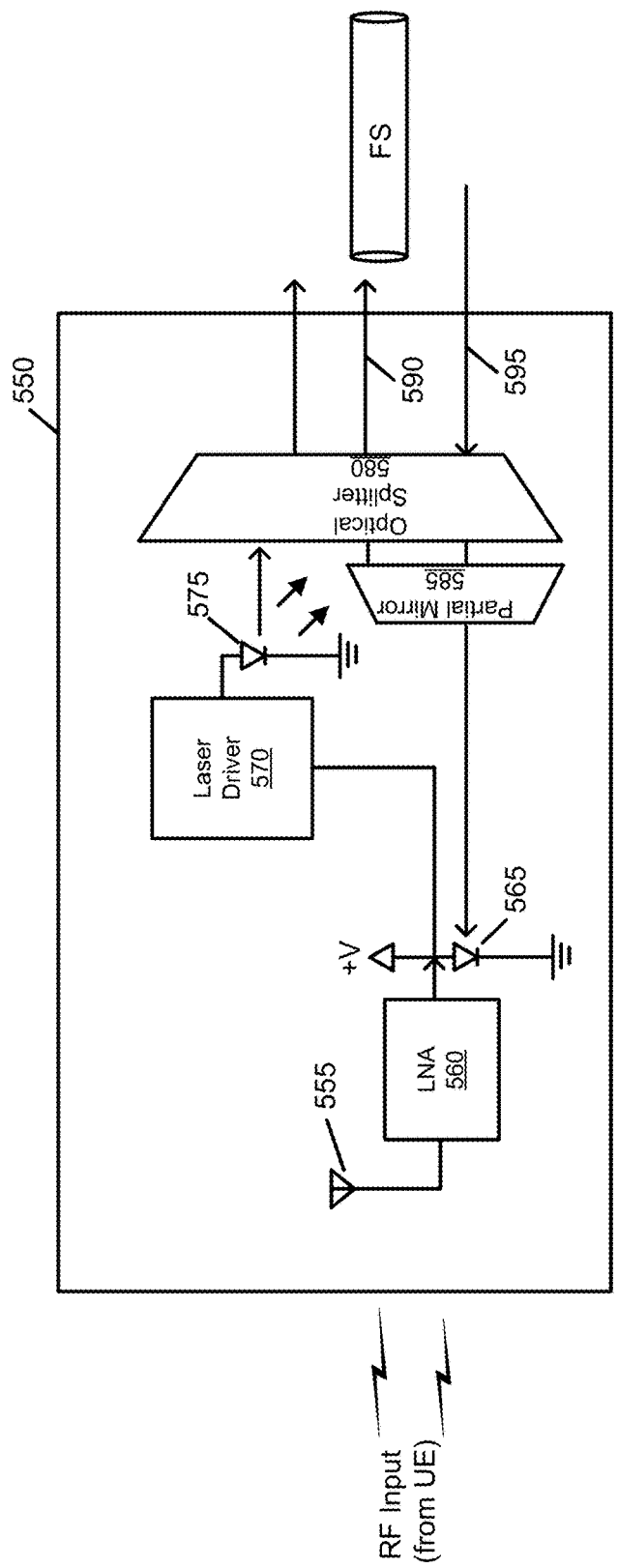

FIGS. 5A-5C are diagrams illustrating example components relating to uplink operation using stamp cells 150. As shown, RF input signals may be received by stamp cell uplink TX circuitry 550 and converted into optical signals. The optical signals may be received by tower uplink RX circuitry 510.

As shown in FIG. 5A, a high frequency RF signal (i.e., an uplink signal originated at a UE 210) may be received at stamp cell uplink TX circuitry 550 of stamp cell 150. The RF signal may be converted into an optical signal for transmission to tower uplink RX circuitry 510. The optical signal may be transmitted over a free-space link. Tower uplink RX circuitry 510 may convert the optical signal into a baseband bitstream, which may be forwarded, via distribution network 220, to packet core 230.

FIG. 5B is a diagram illustrating an example implementation of tower uplink RX circuitry 510. As shown, tower uplink RX circuitry 510 may include: photo diode 515, filter 520, and decoding component 525.

Photo diode 515 may convert the incoming optical signal (from stamp cell 150) to an electrical signal. The electrical signal may be an RF signal (e.g., bandwidth on the order of GHz) which may be filtered and decoded by filter 520 and decoding component 525. The decoding may include conversion of the RF signal to a baseband signal, which may be output as a bitstream via distribution network 220.

FIG. 5C is a diagram illustrating an example implementation of stamp cell uplink TX circuitry 550. As shown, stamp cell uplink TX circuitry 550 may include: antenna 555, Low Noise Amplifier (LNA) 560, photo diode 565, laser driver 570, laser diode 575, optical splitter 580, and partial mirror 585.

Antenna 555 may receive the RF signals from UE 210. In some implementations, antenna 555 and antenna 370 may be the same antenna. The electrical signals output by antenna 555 may be amplified by LNA 560. The output of LNA 560 may drive laser driver 570. Additionally, as shown in FIG. 5C, photo diode 565 may be used to combine a reflected version of the optical signal (received as input optical signal 595 from cell tower 160) with the modulated RF signal. In particular, the input optical signal 595 may be split and reflected using partial mirror 585. One part of the optical signal may be passed to photo diode 565 and the other part reflected back to the base station.

Laser driver 570 may receive the output of LNA 560 (as affected by photo diode 565) and may drive laser diode 575 to generate an optical signal that is input to optical splitter 580. Optical splitter 580 may receive, as inputs: the output of laser diode 575 and a reflected optical signal 590. The reflected optical signal may be a reflected version of input optical signal 595. Optical splitter 580 may be used to split the output of laser diode 575 and/or the reflected optical signal to create a final plurality of uplink optical signals (e.g., the light returning to the base station may now have two components: the reflected signal which has been modulated with the second light signal modulated by the RF input radio wave).

In some implementations, as with stamp cell downlink RX circuitry 350, stamp cell uplink TX circuitry 550 may be passively powered. For example, energy from input optical signal 595 may be used to power the various components of stamp cell uplink TX circuitry 550. Alternatively or additionally, a battery may be used to provide power to stamp cell uplink TX circuitry 550. Alternatively or additionally, input optical signal 595, or another optical signal received from cell tower 560, such as a relatively high energy laser beam that is transmitted expressly for the purpose of providing power to stamp cell uplink TX circuitry 550, may be used to provide the energy needed to operate stamp cell uplink TX circuitry 550. For example, cell tower 160 may transmit an optical signal that is designed to be provided to solar cells for the generation of electrical power.

As discussed above, multiple light signals, separated by frequency spacing that correspond to high frequency RF signals, may be used in the implementation of stamp cells 150. In some examples discussed above, a 60 GHz RF carrier may generated from multiple light waves. Table I, below, provides example light wave spacing that can be used to obtain the 60 GHz carriers.

TABLE I

| Ch Spacing 60 GHz c = 299,792,458 m/s | |
|---|---|
| Freq. (GHz) | Wavelength (nm) |
| 197300 | 1519.48 |
| 197240 | 1519.94 |
| 197180 | 1520.4 |
| 197120 | 1520.86 |
| 197060 | 1521.33 |
| 197000 | 1521.79 |
| 196940 | 1522.25 |
| 196880 | 1522.72 |
| 196820 | 1523.18 |
| 196760 | 1523.65 |
| 196700 | 1524.11 |
| 196640 | 1524.58 |
| 196580 | 1525.04 |
| 196520 | 1525.51 |
| 196460 | 1525.97 |
| 196400 | 1526.44 |
| 196340 | 1526.9 |
| 196280 | 1527.37 |
| 196220 | 1527.84 |
| 196160 | 1528.31 |
| 196100 | 1528.77 |
| 196040 | 1529.24 |
| 195980 | 1529.71 |
| 195920 | 1530.18 |
| 195860 | 1530.65 |
| 195800 | 1531.12 |
| 195740 | 1531.59 |
| 195680 | 1532.05 |
| 195620 | 1532.52 |
| 195560 | 1532.99 |
| 195500 | 1533.47 |
| 195440 | 1533.94 |
| 195380 | 1534.41 |
| 195320 | 1534.88 |
| 195260 | 1535.35 |
| 195200 | 1535.82 |
| 195140 | 1536.29 |
| 195080 | 1536.77 |
| 195020 | 1537.24 |
| 194960 | 1537.71 |
| 194900 | 1538.19 |
| 194840 | 1538.66 |
| 194780 | 1539.13 |
| 194720 | 1539.61 |
| 194660 | 1540.08 |
| 194600 | 1540.56 |
| 194540 | 1541.03 |
| 194480 | 1541.51 |
| 194420 | 1541.98 |
| 194360 | 1542.46 |
| 194300 | 1542.94 |
| 194240 | 1543.41 |
| 194180 | 1543.89 |
| 194120 | 1544.37 |
| 194060 | 1544.84 |
| 194000 | 1545.32 |
| 193940 | 1545.8 |
| 193880 | 1546.28 |
| 193820 | 1546.76 |
| 193760 | 1547.24 |
| 193700 | 1547.72 |
| 193640 | 1548.19 |
| 193580 | 1548.67 |
| 193520 | 1549.15 |
| 193460 | 1549.64 |
| 193400 | 1550.12 |
| 193340 | 1550.6 |
| 193280 | 1551.08 |

In the description above, CW modulation was generally described. In some embodiments, more complex light spacing (Lambdas) can be used to implement more complex modulation schemes. In one implementation, three light frequencies may be used to implement FSK modulation. For example, from Table I, the frequencies 197300 GHz (F1), 197240 GHz (F2), and 197180 GHz (F3) may be used. To generate FSK LoF (the low frequency), F3 and F2 may be combined (F3-F2). To generate FSK HiF (the high frequency), F3 and F1 may be combined (F3-F1).

In other implementations, additional modulation schemes, such as Quadrature Amplitude Modulation (QAM) or Orthogonal Frequency Division Modulation (OFDM) may be implemented using additional light signals. Potentially, terabit per second wireless transmissions can be achieved.

Figure 6:
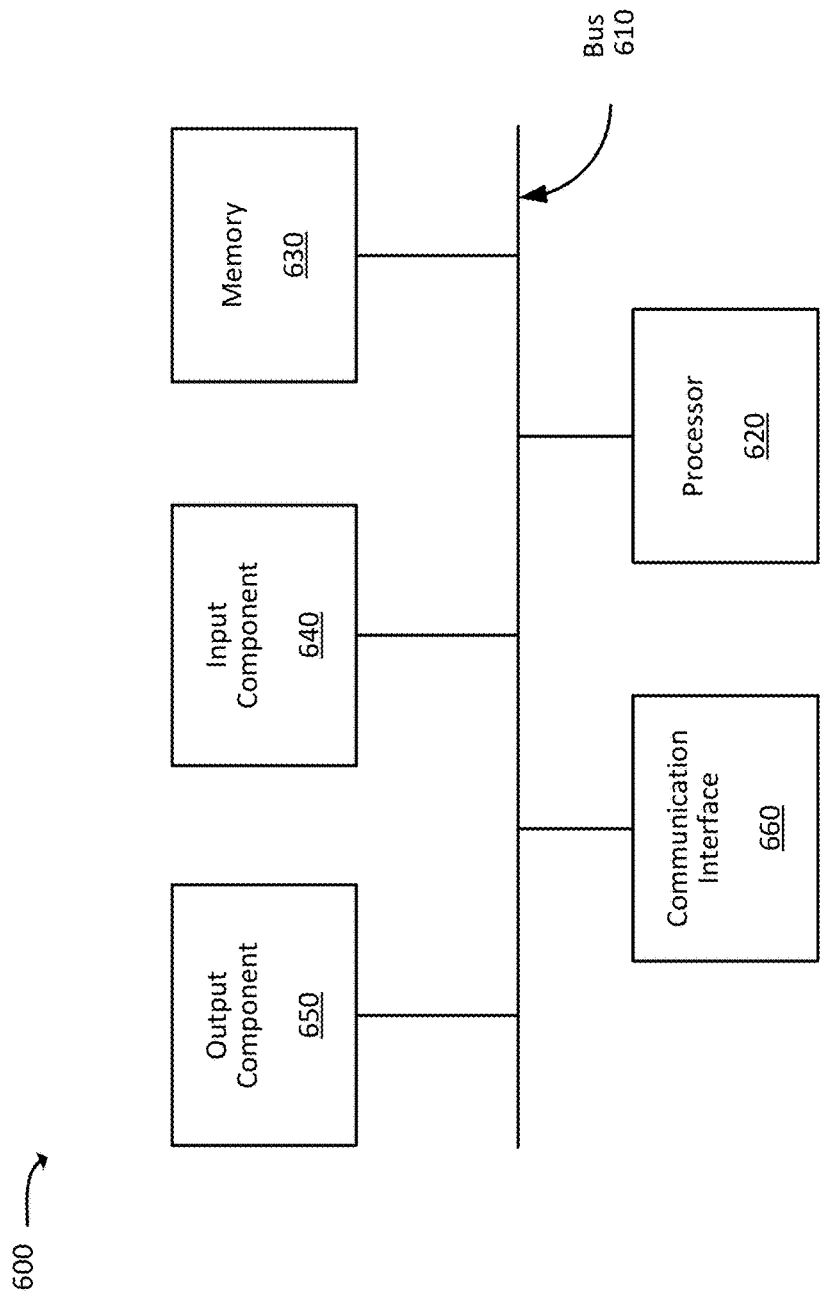
FIG. 6 is a diagram of example components of a device.

FIG. 6 is a diagram of example components of device 600. Device 600 may be used to implement certain of the devices described above, such as UEs 210 or as network elements of packet core 230 or external network 240. Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
    downlink circuitry including:
        a photo diode to receive free-space optical signals, transmitted by a wireless access node of a telecommunications network, the free-space optical signals including at least two optical channels that are spaced by a frequency differential that is in a Radio Frequency (RF) range, the photo diode outputting an electrical current that has a bandwidth corresponding to the frequency differential, and
        a first antenna to receive the output electrical current and to convert the output electrical current into an output radio wave; and
    uplink circuitry including:
        a second antenna to receive an uplink RF wave from User Equipment (UE) and to output an uplink electrical current,
        a reflective optical component to generate a first optical channel that is based on a reflected version of a second optical channel that is received from the wireless access node, and
        a laser diode to directly generate a third optical channel based on the uplink electrical current, for transmission to the access node as a free-space optical transmission,
            wherein an output optical signal includes the first optical channel and at least the third optical channel, wherein the first and third optical channels are spaced by the frequency differential.

2. The device of claim 1, wherein the first and second antennas include a shared physical structure.

3. The device of claim 1, wherein the frequency differential is approximately 60 gigahertz (GHz).

4. The device of claim 1, wherein the device is powered based on energy obtained from the received free-space optical signals or the received uplink RF signal.

5. The device of claim 1, wherein the uplink and downlink circuitry implement Continuous Wave (CW) modulation or Frequency-shift keying (FSK) modulation.

6. The device of claim 1, wherein the uplink circuitry further includes:
    an amplifier to amplify the uplink electrical signal, and
    a laser driver to receive an output of the amplifier and to drive the laser diode.

7. The device of claim 1, wherein the uplink circuitry is further configured to:
    transmit the output optical signal over a free-space link to tower uplink circuitry which converts the output optical signal into a baseband bitstream and forwards the baseband bitstream to a core of a wireless telecommunications network.

8. An optical to radio frequency (RF) transceiver device comprising:
    downlink circuitry configured to:
        receive free-space optical signals, transmitted by a wireless access node of a telecommunications network, the free-space optical signals including at least two optical channels that are spaced by a frequency differential that is in a Radio Frequency (RF) range,
        convert the received optical signals to an electrical current that has a bandwidth corresponding to the frequency differential, and
        convert the electrical current into a radio wave for transmission to User Equipment (UE); and
    uplink circuitry configured to:
        receive an RF signal from the UE,
        convert the RF signal to an uplink electrical current,
        generate a first optical channel that is based on a reflected version of a second optical channel that is received from the wireless access node,
        directly generate a third optical channel based on the uplink electrical current, and
        generate an output optical signal that includes the first optical channel and at least the third optical channel, wherein the first and third optical channels are spaced by the frequency differential.

9. The device of claim 8, wherein the frequency differential is approximately 60 gigahertz (GHz).

10. The device of claim 8, wherein the device is powered based on energy obtained from the received free-space optical signals or the received RF signal.

11. The device of claim 8, wherein the device implements Continuous Wave (CW) modulation or Frequency-shift keying (FSK) modulation.

12. The device of claim 8, wherein the uplink component is further to:
    amplify the uplink electrical current, and
    provide the amplified uplink electrical current to a laser driver.

13. The device of claim 8, wherein the uplink circuitry is further configured to:
    transmit the output optical signal over a free-space link to tower uplink circuitry which converts the output optical signal into a baseband bitstream and forwards the baseband bitstream to a core of a wireless telecommunications network.

14. A method, comprising:
    receiving, by a photo diode of a device, free-space optical signals, transmitted by a wireless access node of a telecommunications network, the free-space optical signals including at least two optical channels that are spaced by a frequency differential that is in a Radio Frequency (RF) range, the photo diode outputting an electrical current that has a bandwidth corresponding to the frequency differential;
    receiving, by a first antenna of the device, the output electrical current; converting, by the first antenna, the output electrical current into an output radio wave;
    receiving, by a second antenna of the device, an uplink RF wave from User Equipment (UE); outputting, by the second antenna, an uplink electrical current that is based on the received uplink RF wave; generating, by a reflective optical component of the device, a first optical channel that is based on a reflected version of a second optical channel that is received from the wireless access node;
    directly generating, by a laser diode of the device, a third optical channel based on the uplink electrical current for transmission to the access node as a free-space optical transmission; and generating, by the device, an output optical signal that includes the first optical channel and at least the third optical channel, wherein the first and third optical channels are spaced by the frequency differential.

15. The method of claim 14, wherein the first and second antennas include a shared physical structure.

16. The method of claim 14, wherein the frequency differential is approximately 60 gigahertz (GHz).

17. The method of claim 14, wherein the device is powered based on energy obtained from the received free-space optical signals or the received uplink RF signal.

18. The method of claim 14, wherein the device implements Continuous Wave (CW) modulation or Frequency-shift keying (FSK) modulation.

19. The method of claim 14, further comprising:
   amplifying the uplink electrical current, and
   providing the amplified uplink electrical current to a laser driver.

20. The method of claim 14, further comprising:
   transmitting the output optical signal over a free-space link to tower uplink circuitry which converts the output optical signal into a baseband bitstream and forwards the baseband bitstream to a core of a wireless telecommunications network.

* * * * *